(12) United States Patent
Kube

(10) Patent No.: US 9,994,333 B2
(45) Date of Patent: Jun. 12, 2018

(54) ROTORCRAFT WINCH LIGHTING DEVICE AND METHOD OF OPERATING A ROTORCRAFT WINCH LIGHTING DEVICE

(71) Applicant: Goodrich Lighting Systems GmbH, Lippstadt (DE)

(72) Inventor: Adrian Kube, Winterberg (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 174 days.

(21) Appl. No.: 15/190,442

(22) Filed: Jun. 23, 2016

(65) Prior Publication Data

US 2016/0376028 A1   Dec. 29, 2016

(30) Foreign Application Priority Data

Jun. 24, 2015   (EP) ..................................... 15173594

(51) Int. Cl.
| | |
|---|---|
| B64D 47/04 | (2006.01) |
| B64D 1/22 | (2006.01) |
| B64F 1/12 | (2006.01) |
| H02J 5/00 | (2016.01) |
| H02J 7/02 | (2016.01) |
| B64C 27/04 | (2006.01) |

(52) U.S. Cl.
CPC .............. *B64D 47/04* (2013.01); *B64C 27/04* (2013.01); *B64D 1/22* (2013.01); *B64F 1/12* (2013.01); *H02J 5/005* (2013.01); *H02J 7/025* (2013.01)

(58) Field of Classification Search
CPC ........... H02J 5/005; H02J 7/025; B64C 27/04; B64F 1/12; B64D 47/04
See application file for complete search history.

(56) References Cited

U.S. PATENT DOCUMENTS

| | | | |
|---|---|---|---|
| 3,569,690 A | 3/1971 | Nelson | |
| 5,074,608 A | 12/1991 | Gabriel | |
| 5,299,845 A | 4/1994 | Gabriel | |
| 5,589,901 A | 12/1996 | Means | |
| 5,826,825 A | 10/1998 | Gabriel | |

(Continued)

FOREIGN PATENT DOCUMENTS

| | | |
|---|---|---|
| DE | 102013004881 A1 | 9/2014 |
| WO | 2013180803 A2 | 12/2013 |

OTHER PUBLICATIONS

Extended European Search Report of the European Patent Office for International Application No. EP15173594.1, dated Oct. 29, 2015, 7 pages.

*Primary Examiner* — Robert Deberadinis
(74) *Attorney, Agent, or Firm* — Cantor Colburn LLP

(57) ABSTRACT

A rotorcraft winch lighting device, which is attachable to a rotorcraft winch, mounted to a rotorcraft such as a helicopter, the rotorcraft winch including a stationary portion and a mobile portion which is movable with respect to the stationary portion, includes: a stationary unit including a stationary coil and a mobile unit. The mobile unit is movable with respect to the stationary unit and includes at least one light source, at least one electrical storage device, and at least one mobile coil, which is electrically connected to the electrical storage device and/or the at least one light source. The stationary coil and the mobile coil are configured for transferring electrical energy from the stationary unit to the mobile unit when the at least one mobile coil is positioned in an energy transfer position in the vicinity of the at least one stationary coil.

14 Claims, 3 Drawing Sheets

(56) References Cited

U.S. PATENT DOCUMENTS

| | | | |
|---|---|---|---|
| 5,836,548 | A | 11/1998 | Dietz et al. |
| 5,868,357 | A | 2/1999 | Gabriel |
| 6,962,423 | B2 | 11/2005 | Hamilton et al. |
| 7,025,304 | B2 | 4/2006 | Kolliopoulos |
| 7,234,828 | B2 | 6/2007 | Kelly et al. |
| 8,836,541 | B2 | 9/2014 | Fidanza |
| 2005/0236516 | A1 | 10/2005 | Kolliopoulos |
| 2011/0001437 | A1 | 1/2011 | Marcaccio et al. |
| 2014/0239165 | A1 | 8/2014 | Rolland |

ROTORCRAFT WINCH LIGHTING DEVICE AND METHOD OF OPERATING A ROTORCRAFT WINCH LIGHTING DEVICE

FOREIGN PRIORITY

This application claims priority to European Patent Application No. 15 173 594.1 filed Jun. 24, 2015, the entire contents of which is incorporated herein by reference.

TECHNICAL FIELD

The present invention relates to exterior lighting of rotorcraft, in particular, exterior helicopter lighting. In particular, the present invention relates to a rotorcraft winch lighting device, in particular to a lighting device for a rotorcraft winch which is mounted to a rotorcraft such as a helicopter. The invention further relates to a rotorcraft winch and to a rotorcraft, in particular a helicopter, respectively comprising such a rotorcraft winch lighting device.

BACKGROUND OF THE INVENTION

Rotorcraft, in particular helicopters, are occasionally equipped with a rotorcraft winch for lifting people and/or cargo. When such a rotorcraft winch is operated under dark ambient conditions, in particular at night, artificial light is needed in order to allow the pilot to see the actual position of the lower end of the rotorcraft winch as well as its surroundings. Further, a rescuer attached to the lower end of the rotorcraft winch needs light for identifying people and/or stuff to be lifted by the rotorcraft winch.

It therefore would be beneficial to provide a lighting device which allows illuminating an area in the vicinity of the lower end of the rotorcraft winch.

SUMMARY

Exemplary embodiments of the invention include a rotorcraft winch lighting device, which is attachable to a rotorcraft winch, mounted to a rotorcraft, wherein the rotorcraft winch comprises a stationary portion and a mobile portion which is movable with respect to the stationary portion. The rotorcraft winch lighting device comprises a stationary unit, which is stationary with respect to the stationary portion of the rotorcraft winch, and a mobile unit, which is movable with respect to said stationary unit. The stationary unit includes at least one stationary coil. The mobile unit comprises at least one light source, at least one electrical storage device and at least one mobile coil, which is electrically connected to the electrical storage device and/or the light source. The at least one stationary coil and the at least one mobile coil are configured for transferring electrical energy from the stationary unit to the mobile unit when the at least one mobile coil is positioned in an energy transfer position close to the at least one stationary coil.

Exemplary embodiments of the invention further include a rotorcraft winch comprising a rotorcraft winch lighting device according to an exemplary embodiment of the invention, and a rotorcraft, in particular a helicopter, comprising such a rotorcraft winch. The rotorcraft winch lighting device may be attached to the rotorcraft winch, with the stationary unit being attached to the stationary portion and the mobile unit being attached to the mobile portion.

A rotorcraft winch lighting device according to an exemplary embodiment of the invention allows to reliably supply electrical energy for operating the at least one mobile light source without the need of providing a wire connection between the stationary portion and the mobile portion of the rotorcraft winch. Thus, the problems related to a wire connection, which is prone to damage when used in combination with a rotorcraft winch, in particular under extreme conditions which might occur when the rotorcraft winch is attached to and operated from a helicopter, may be avoided.

In an embodiment, the stationary unit is attached to or formed integral with the stationary portion of the rotorcraft winch. This provides a compact structure which may be installed easily. For example, the rotorcraft winch and the rotorcraft winch lighting device may be jointly installed in a rotorcraft, such as a helicopter, in a comparably easy manner. The stationary unit of the rotorcraft winch lighting device may be attachable to the stationary portion of the rotorcraft winch.

According to a further embodiment, the mobile unit of the rotorcraft winch lighting device is attached to or formed integral with the mobile portion of the rotorcraft winch. The mobile unit of the rotorcraft winch lighting device may be attachable to the mobile portion of the rotorcraft winch.

In a further embodiment, the at least one light source comprises at least one LED. LEDs have a higher efficiency than conventional light sources, as e.g. halogen bulbs, and thus allow to generate the light needed with less electrical power. With the capacity of the electrical power storing device being limited, reducing the need for electrical power increases the maximum time of operation, which is provided before the electrical power storing device needs to be recharged.

In a further embodiment, the electrical storage device comprises at least one of a battery, a capacitor and a super capacitor ("supercap"). A battery provides a cheap electrical storage device. A capacitor and a super capacitor respectively provide electrical storage devices which may be charged faster than a battery. Thus, the period of time, in which the rotorcraft winch is not operable, as the electrical storage device is recharged, may be minimized. A super capacitor provides an enhanced capacity extending the maximum time of operation of the light source(s).

In a further embodiment, the at least one mobile coil is elastically supported by the mobile unit. Elastically supporting the mobile coil allows for reliably positioning the mobile coil adjacent to the stationary coil without the risk of damaging the stationary coil and/or the mobile coil by applying too much force to the interface between the stationary coil and the mobile coil. The force applied to said interface may be selectively set by selecting an elastic support element with appropriate elastic characteristics.

Each of the coils may be provided as a conductive path formed as a helical line on a printed circuit board. Such a structure provides a mechanically stable coil, which is easy to produce at low costs.

In an embodiment, the mobile unit comprises a first component and a second component, wherein the second component supports or houses the at least one mobile coil and wherein the second component is elastically supported by the first component in order to elastically support the at least one mobile coil. The first component may be attachable to the mobile portion of the rotorcraft winch, thus defining the position of the mobile unit with respect to the mobile portion of the rotorcraft winch.

In an embodiment, the at least one light source and/or the at least one electrical storage device are supported by the first component in order to allow relative movement of the mobile coil with respect to the at least one light source and/or the at least one electrical storage device.

In a further embodiment, the rotorcraft winch lighting device further comprises a positional sensor, which is configured for detecting whether the mobile coil is positioned in the energy transfer position. A positional sensor allows to activate the alternating current flowing through the stationary coil only when the mobile coil is positioned in the energy transfer position. This enhances the efficiency of the rotorcraft winch lighting device, as it avoids any unnecessary current flowing through the stationary coil, when the mobile coil is not positioned in the energy transfer position and thus no transfer of energy is possible.

In a further embodiment, the positional sensor is a capacitive sensor attached to the stationary unit. The capacitive sensor is configured for detecting a capacitive plate attached to the mobile unit of the rotorcraft winch lighting device. A capacitive sensor provides a positional sensor, which works reliably even under adverse ambient conditions. In alternative embodiments, the positional sensor may be a mechanical sensor and/or an optical sensor. Of course, also a combination of sensors may be used in order to enhance the reliability of the detection signals.

Additionally or alternatively, the presence of the at least one mobile coil in the energy transfer position may be detected by means of the electromagnetic feedback generated by the induced current flowing through the at least one mobile coil and being detected by the at least one stationary coil.

In a further embodiment, the mobile device additionally comprises at least one indicator element, in particular an optical indicator element, which is configured for providing information related to the amount of energy actually stored within the electrical storage device. Such an indicator element allows a pilot, rescuer and/or operator of the rotorcraft winch to monitor the momentary storage state of the electrical storage device in order to recharge the electrical storage device before its energy is completely exhausted and the light source(s) will extinguish. This also enhances the safety of operation, as a sudden exhaustion of the at least one light source during operation of the rotorcraft winch may be prevented.

In a further embodiment, the mobile unit also comprises a power management controller, which is configured for monitoring and/or controlling the electrical energy supplied to the electrical storage device and/or to the at least one light source. Such a power management controller allows an effective operation of the at least one light source and helps to avoid any damage of the electrical storage device due to electrical overloading.

Exemplary embodiments of the invention further include a method of operating a rotorcraft winch lighting device, as described in any of the embodiments above, comprising the steps of positioning the at least one mobile coil in the energy transfer position close to the at least one stationary coil and supplying an alternating current to the at least one stationary coil.

The method may further include the steps of activating the at least one light source and moving the mobile unit from the energy transfer position close to the stationary unit next to an operating position in which the mobile unit is spaced apart from the stationary unit.

It is pointed out that the moving of the rotorcraft winch lighting device may be achieved by moving the mobile portion of the rotorcraft winch. In other words, the moving of the mobile unit of the rotorcraft winch lighting device may happen as a byproduct of moving the mobile portion of the rotorcraft winch.

The rotorcraft may for example be a helicopter or quadrocopter or octocopter. Accordingly, the rotrocraft winch may for example be a helicopter winch, a quadrocopter winch or an octocopter winch. Further, the rotorcraft winch lighting device may for example be a helicopter winch lighting device or a quadrocopter winch lighting device or an octocopter winch lighting device.

BRIEF DESCRIPTION OF DRAWINGS

Exemplary embodiments of the invention are described in greater detail below with reference to the enclosed figures.

DETAILED DESCRIPTION OF THE INVENTION

Figure 1:
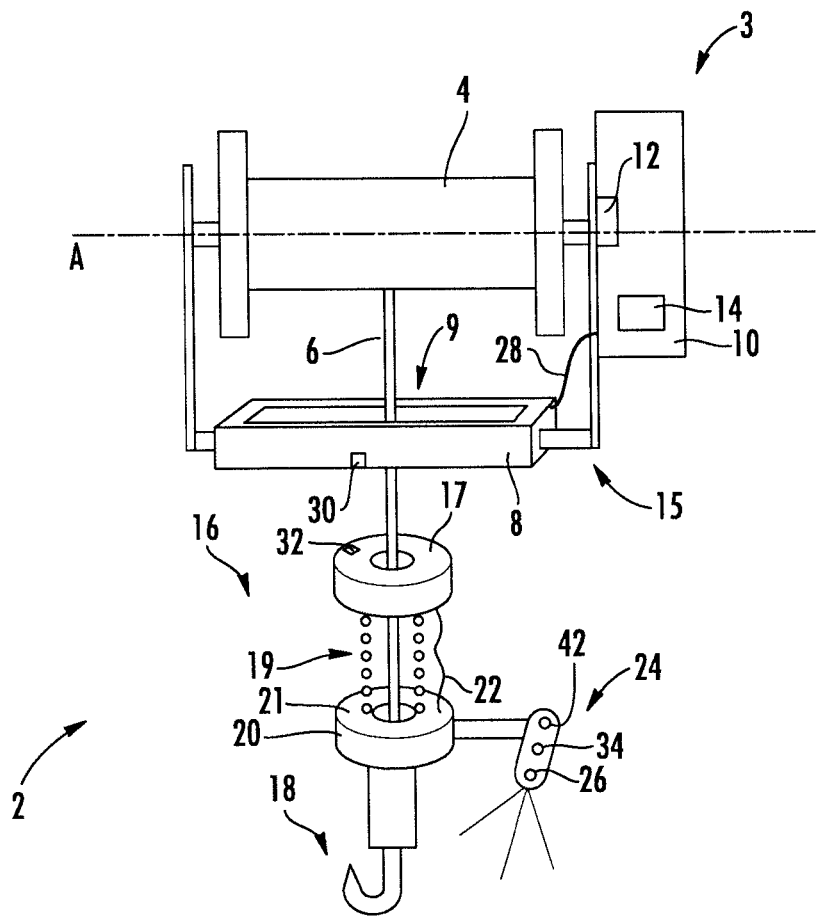
FIG. 1 shows a rotorcraft winch comprising a rotorcraft winch lighting device according to an exemplary embodiment of the invention.

FIG. 1 illustratively shows a rotorcraft winch 2 including a rotorcraft winch lighting device 15, 16 according to an exemplary embodiment of the invention.

The rotorcraft winch 2 comprises a stationary portion 3 including a drum 4, which is rotatably around a horizontal axis A for winding a rope 6, a first end of said rope 6 being attached to the drum 4.

By rotating the drum 4 and winding the rope 6, a hooking device 18, which is attached to an opposing end of the rope 6, is movable up and down. It is appreciated that the hooking device 18 may be a simple hook, as shown in FIG. 1, or a more sophisticated hooking device 18, which is configured for attaching persons, equipment and/or goods to the lower end of the rope 6.

A stationary coil 8 is arranged next to the drum 4. In the embodiment shown in FIG. 1, the stationary coil 8 is located below the drum 4 and comprises a central opening 9. The rope 6 passes through said central opening 9 so that the rope 6 is surrounded by the stationary coil 8.

The stationary coil 8 is electrically connected to a stationary power supply 14 by means of an electric cable 28. The stationary power supply 14 is part of a stationary control unit 10, which further comprises a motor 12 which is configured for rotating the drum 4.

A mobile unit 16 of the rotorcraft winch lighting device 15, 16 is attached to the rope 6 close to the hooking device 18.

The mobile unit 16 comprises a lower first component 20 and an upper second component 17, which is elastically supported on a top surface 21 of the first component 20 by means of an elastic element 19. The lower first component is attached to the rotorcraft winch 2 close to the hooking device 18 and thus defines a position of the mobile unit 16 with respect to the rotorcraft winch 2.

Figure 2:
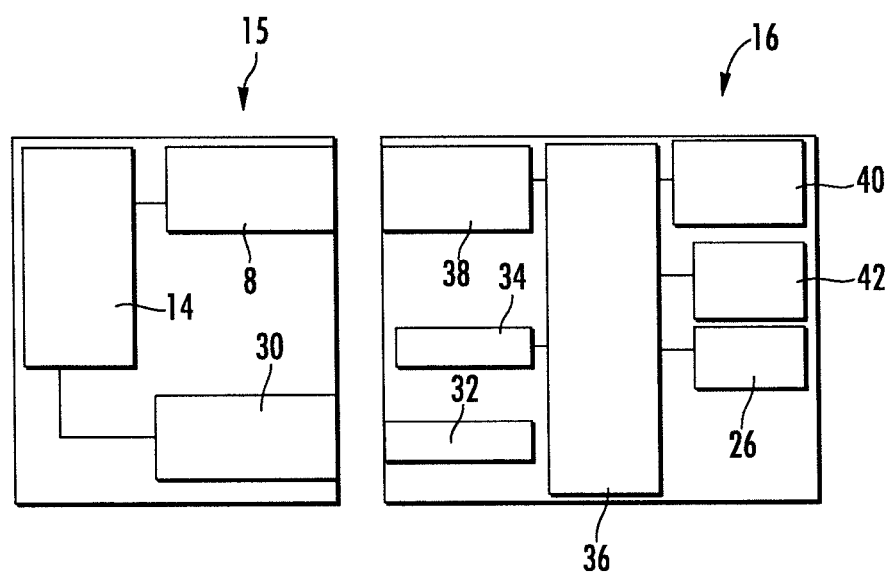
FIG. 2 shows a schematic block-diagram of a rotorcraft winch lighting device according to an exemplary embodiment of the invention.

The first component 20 of the mobile unit 16 comprises a mobile control unit 36 and an electrical storage device 40 (both not shown in FIG. 1, see FIG. 2). At least one light head 24 including at least one light source 26, in particular an LED, is attached to the first component 20. The at least one light source 26 is configured for illuminating the area below the hooking device 18.

The second component 17 of the mobile unit 16 comprises at least one mobile coil 38 (not shown in FIG. 1, see FIG. 2). The at least one mobile coil 38 is electrically connected to the first component 20 by means of an electric cable 22.

When the hooking device 18 is moved into an energy transfer position by winding up the rope 6 onto the drum 4, the second component 17 of the mobile unit 16 is positioned next to the stationary coil 8, in particular in a position abutting the lower surface of the stationary coil 8. An oscillating electro-magnetic field is generated by the stationary coil 8, when an alternating current (AC) is supplied to the stationary coil 8 from the stationary power unit 14 via the electric cable 28. Said oscillating electro-magnetic field induces a corresponding AC in the mobile coil 38 housed within the second component 17.

The electric energy provided by said induced AC may be used for operating the light source 26 and/or may be stored in the electrical storage device 40 in order to allow operating the light source 26 when the hooking device 18 has been moved to a working position in which the second component 17 of the mobile unit 16 is not arranged next to stationary coil 8 anymore. When the hooking device 18 has been moved into such a working position, the distance between the stationary coil 8 and the mobile coil 38 is too large for effectively transferring electrical energy by means of an oscillating electromagnetic field.

Elastically supporting the second component 17 on the first component 20 of the mobile unit 16 allows to reliably position the second component 17 in the energy transfer position, in which the mobile coil 38 abuts the stationary coil 8, without the risk of damaging the stationary coil 8 and/or the second component 17 by applying too much force to the interface between the stationary coil 8 and the second component 17.

In an embodiment, a positional sensor 30 is provided at or next to the stationary coil 8 in order to allow detecting the presence of the second component 17 next to the stationary coil 8. Detecting the presence of the second component 17 next to the stationary coil 8 allows to activate the alternating current flowing through the stationary coil 8 only in case the second component 17, including the mobile coil 38, is arranged in the vicinity of the stationary coil 8, allowing an effective transfer of electrical energy by means of the oscillating electromagnetic field.

In an exemplary embodiment, the positional sensor 30 is a capacitive positional sensor 30, and a capacitive plate 32 is attached to the second component 17 in order to be detected by the capacitive positional sensor 30.

Alternatively, the positional sensor 30 may be provided as a mechanical and/or an optical sensor, which is capable to detect the presence of the second component 17 of the mobile unit 16 in the vicinity of the stationary coil 8.

FIG. 2 shows a schematic block-diagram of a rotorcraft winch lighting device 15, 16 according to an exemplary embodiment of the invention.

The elements of the stationary unit 15 are schematically shown on the left side of FIG. 2, including the control unit 14 being electrically connected to the stationary coil 8 and the positional sensor 30. The control unit 14 is configured to provide electrical power, i.e. to supply an alternating current, to the stationary coil 8 only in case the presence of the movable coil 38 is detected by the positional sensor 30.

The elements of the mobile unit 16 are schematically shown on the right side of FIG. 2. The elements of the mobile unit 16 include the mobile coil 38, which is electrically connected to a mobile power management controller 36. Said mobile power management controller 36 comprises a rectifier and a capacitor for rectifying and smoothening the alternating current provided by the mobile coil 38.

The mobile power management controller 36 is further configured for adjusting the voltage and for supplying the energy provided by the mobile coil 38 to an electrical storage device 40 in order to be stored for later use. The mobile power management controller 36 is also configured for supplying power provided from the movable coil 38 and/or the electrical power device 40 to the light source(s) 26 in order to illuminate an area in the vicinity of the hoking device 18.

The at least one light source 26 may be activated and deactivated by means of a switching device 34, which is electrically connected to the controller 36. Additionally, at least one optical indicator element 42, e.g. an LED, indicating the amount of energy actually stored within the electrical storage device 40, is provided.

The elements of the mobile unit 16 may further include a capacitive plate 32 to be detected by the positional sensor 30, which is configured as a capacitive positional sensor 30, in order to detect the presence of the movable coil 38 in a position next to the stationary coil 8 allowing transfer power from the stationary unit 15 to the mobile unit 16 of the rotorcraft winch lighting device 15, 16.

Figure 3:
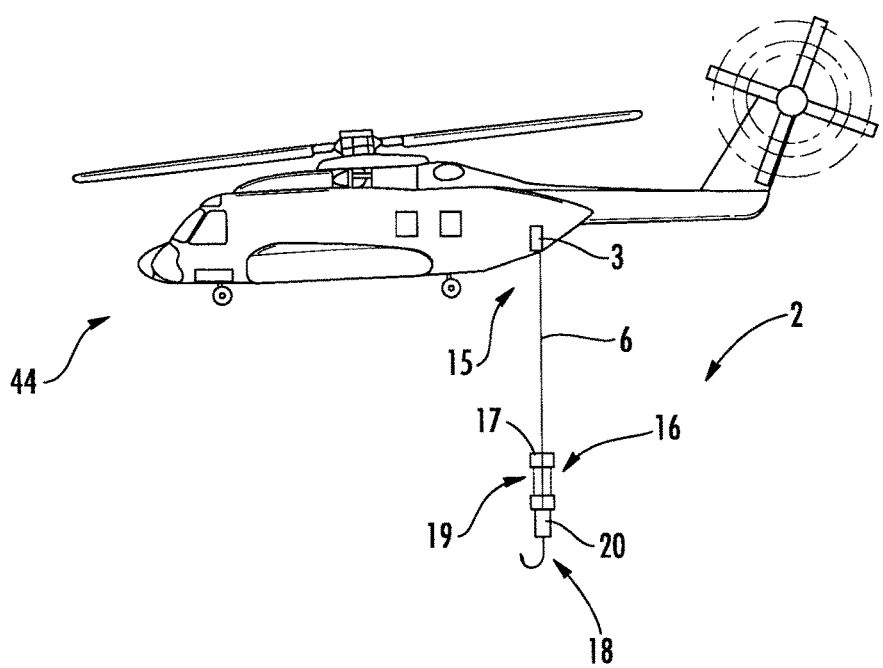
FIG. 3 shows a helicopter comprising a rotorcraft winch with a rotorcraft winch lighting device according to an exemplary embodiment of the invention.

FIG. 3 shows a helicopter 44 comprising a rotorcraft winch 2 including a rotorcraft winch lighting device 15, 16 according to exemplary embodiments of the invention, as discussed above with respect to FIGS. 1 and 2. The rotorcraft winch 2 is attached to a lower portion of the helicopter and is able to hoist people or cargo or other objects up towards the helicopter 44.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. A rotorcraft winch lighting device comprising:
    a stationary unit, including:
        at least one stationary coil; and
        a mobile unit, the mobile unit being movable with respect to the stationary unit and comprising at least one light source, at least one electrical storage device, and at least one mobile coil, which is electrically connected to the electrical storage device and/or the at least one light source;
    wherein the lighting device is attachable to a rotorcraft winch, mounted to a rotorcraft, the rotorcraft winch comprising a stationary portion and a mobile portion which is movable with respect to the stationary portion,
    wherein the at least one stationary coil and the at least one mobile coil are configured for transferring electrical energy from the stationary unit to the mobile unit when the at least one mobile coil is positioned in an energy transfer position in the vicinity of the at least one stationary coil.

2. A rotorcraft winch lighting device of claim 1, wherein the stationary unit is attached to or integral with the stationary portion of the rotorcraft winch.

3. A rotorcraft winch lighting device of claim 1, wherein the at least one light source comprises at least one LED.

4. A rotorcraft winch lighting device of claim 1, wherein the electrical storage device comprises at least one of a battery, a capacitor and a super capacitor.

5. A rotorcraft winch lighting device of claim 1, wherein the at least one mobile coil is elastically supported by the mobile unit.

6. A rotorcraft winch lighting device of claim 1, wherein the mobile unit comprises a first component and a second component, wherein the second component supports or houses the at least one mobile coil and is elastically supported by the first component.

7. A rotorcraft winch lighting device of claim 6, wherein the at least one light source is supported by the first component.

8. A rotorcraft winch lighting device of claim 1, further comprising a positional sensor, which is configured for detecting whether the mobile coil is positioned in the energy transfer position.

9. A rotorcraft winch lighting device of claim 7, wherein the positional sensor is a capacitive sensor attached to the stationary unit and is configured for detecting a capacitive element attached to the mobile unit of the lighting device.

10. A rotorcraft winch lighting device of claim 1, in which the mobile unit additionally comprises at least one indicator element, which is configured for providing information about the momentary storage state of the electrical storage device.

11. A rotorcraft winch lighting device of claim 1, wherein the mobile unit further comprises a power management controller, which is configured for monitoring and/or controlling the electrical energy supplied to the electrical storage device and/or the at least light source.

12. Rotorcraft, in particular helicopter, comprising a rotorcraft winch and a rotorcraft winch lighting device according to claim 1.

13. A method of operating a rotorcraft winch lighting device according to claim 1, including the steps of:
    positioning the mobile coil in the energy transfer position next to the stationary coil, and
    supplying an alternating current to the stationary coil.

14. Method of operating a rotorcraft winch lighting device according to claim 13, further including the steps of:
    activating the at least one light source, and
    moving the mobile unit from the energy transfer position next to the stationary unit to an operating position distant from the stationary unit.

\* \* \* \* \*